(12) United States Patent
Ruth

(10) Patent No.: US 6,186,299 B1
(45) Date of Patent: Feb. 13, 2001

(54) OVERRUNNING COUPLING ASSEMBLY

(75) Inventor: Stephen M. Ruth, Holly, MI (US)

(73) Assignee: Means Industries, Inc., Saginaw, MI (US)

( * ) Notice: Under 35 U.S.C. 154(b), the term of this patent shall be extended for 0 days.

(21) Appl. No.: 09/452,115

(22) Filed: Nov. 30, 1999

Related U.S. Application Data

(63) Continuation-in-part of application No. 09/374,732, filed on Aug. 13, 1999, now Pat. No. 6,116,394.

(51) Int. Cl.$^7$ ................................................ F16D 41/12
(52) U.S. Cl. ...................... 192/46; 192/69.1; 192/113.32
(58) Field of Search ...................... 192/46, 69.1, 113.32; 188/82.7, 82.74, 82.77; 74/576

(56) References Cited

U.S. PATENT DOCUMENTS

| | | |
|---|---|---|
| 5,070,978 | 12/1991 | Pires . |
| 5,597,057 | 1/1997 | Ruth et al. . |
| 5,690,202 | 11/1997 | Myers . |
| 5,829,565 | 11/1998 | Fergle et al. . |
| 5,852,932 | 12/1998 | Matsumoto . |
| 5,855,263 | 1/1999 | Fergle . |
| 5,871,071 | 2/1999 | Sink . |
| 5,918,715 * | 7/1999 | Ruth et al. .............................. 192/46 |
| 5,927,455 * | 7/1999 | Baker et al. ........................ 192/46 X |
| 5,964,331 * | 10/1999 | Reed et al. .............................. 192/46 |
| 6,116,394 * | 9/2000 | Ruth ........................................ 192/46 |

\* cited by examiner

*Primary Examiner*—Richard M. Lorence
(74) *Attorney, Agent, or Firm*—Brooks & Kushman P.C.

(57) ABSTRACT

An overrunning coupling assembly includes a notch plate and an annular coupling pocket plate positioned in face-to-face relationship with respect to each other along a common axis. The pocket plate has strut pockets disposed at angularly spaced positions about the common axis. The notch plate has notch recesses at angularly spaced positions about the common axis and positioned in juxtaposed relationship with respect to the strut pockets. Torque-transmitting struts are positioned in each of the strut pockets. Each strut has first and second ears at one edge thereof for enabling pivotal motion of the struts about an ear axis intersecting the ears. The opposite edge of each strut is movable between disengaged and engaged positions with respect to one of the notch recesses whereby one-way torque transfer may occur between the plates. A lubricant flows between the notch plate and pocket plate. A spring is positioned in each strut pocket and biases the respective strut toward the notch plate. Each spring engages the respective strut intermediate the ear axis and the opposite edge. Each strut pocket provides sufficient clearance forward of the respective opposite edge of the strut to allow forward sliding movement of the respective strut during overrunning to cause the engagement of the respective spring and strut to occur nearer the ear axis, thereby reducing the length of a moment arm about which the spring acts upon the strut which enables frictional forces of the flowing lubricant to hold the strut in its disengaged position to prevent the strut from slapping against the notch recesses as the notch plate and pocket plate are respectively counterrotated.

11 Claims, 4 Drawing Sheets

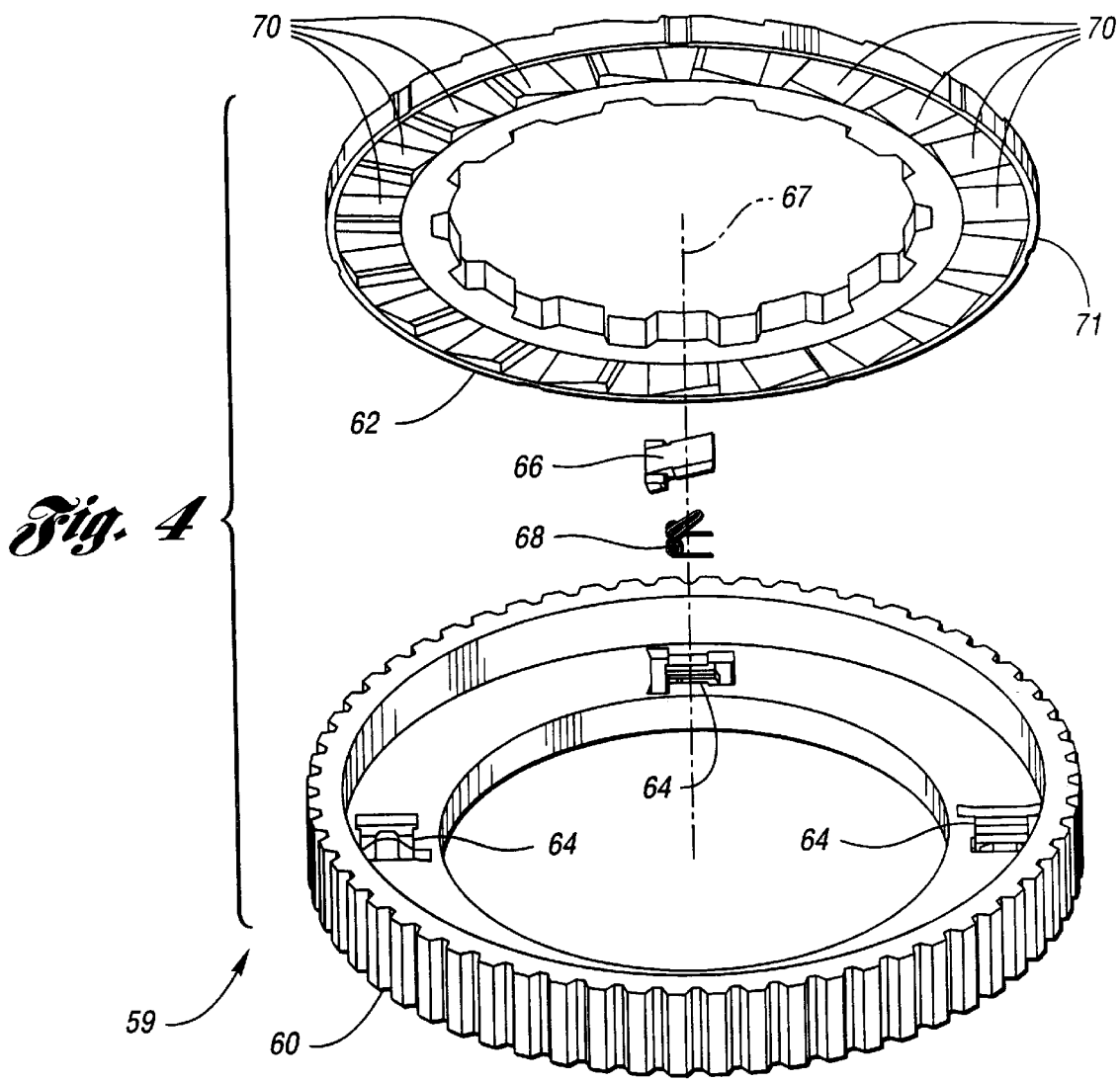
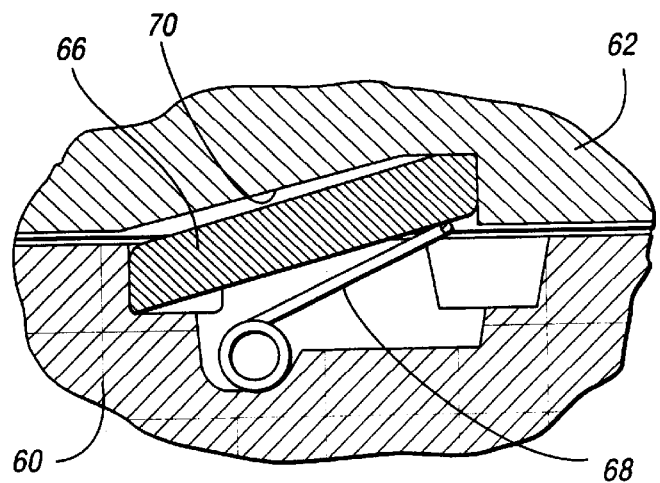

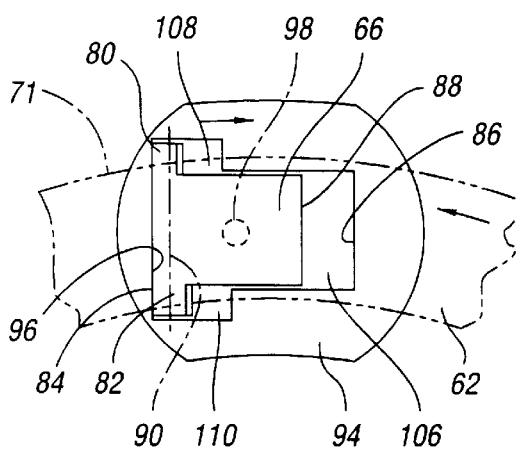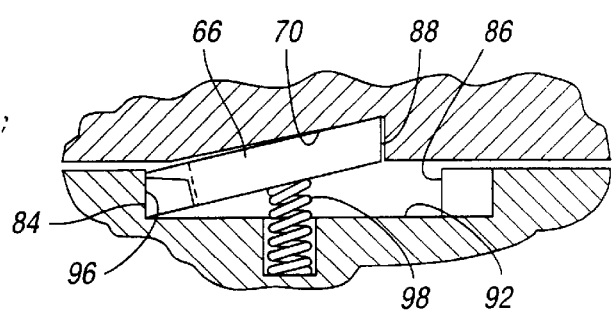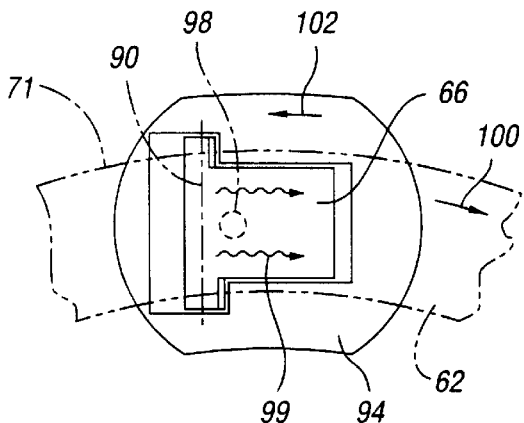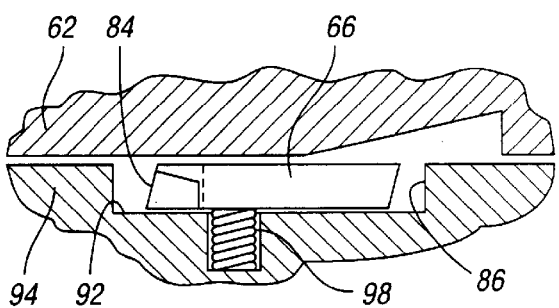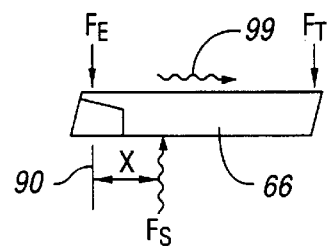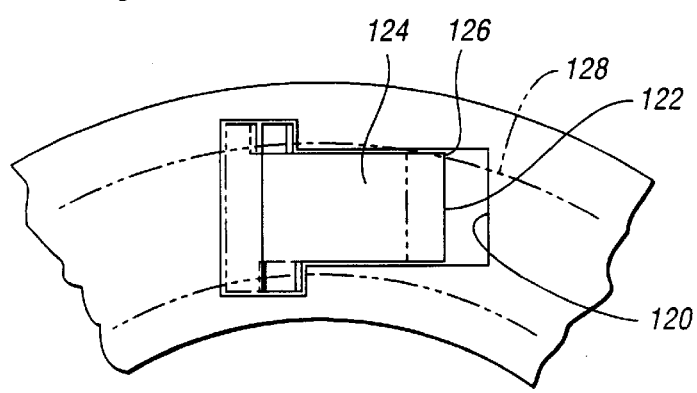

000
OVERRUNNING COUPLING ASSEMBLY

CROSS-REFERENCE TO RELATED APPLICATION

This application is a continuation-in-part of U.S. patent application Ser. No. 09/374,732, filed Aug. 13, 1999, now U.S. Pat. No. 6,116,394 entitled "Overrunning Coupling Assembly" and assigned to the assignee of the present application. This application is hereby incorporated by reference in its entirety.

TECHNICAL FIELD

The present invention relates to an overrunning coupling assembly including enlarged strut pockets so that the struts are tangentially movable to reduce the moment arm of the spring acting on each strut so that the forces of flowing lubricant are sufficient to hold each strut in its disengaged position to prevent the strut from slapping against the notch recesses as the notch plate and pocket plate are respectively counterrotated.

BACKGROUND ART

The invention is adapted especially for use in stator assemblies for torque converter transmissions in an automotive vehicle driveline. The invention may be used also in other applications, however, such as torque transfer drives and chain drives that require an overrunning coupling in a torque flow path.

Torque converter transmissions include a stator assembly having a stator hub secured to a stationary sleeve shaft and stator blades situated between a toroidal flow exit section of a hydrokinetic turbine and the toroidal flow entrance section of a hydrokinetic impeller. The blades of the stator change the direction of the tangential component of the toroidal flow velocity vector at the turbine exit section prior to entry of the toroidal flow to the impeller entrance section. This permits multiplication of torque as the hydrokinetic converter delivers engine power to a power input element of a multiple ratio gearing in the transmission mechanism.

It is known practice in the automotive transmission art to design the stator assembly of a hydrokinetic torque converter transmission with a stator hub that is adapted to receive an overrunning coupling having an outer race and an inner race, the inner race being splined to a stationary sleeve shaft and the outer race being carried by the bladed section of the stator assembly. The outer race typically would be cammed to provide a plurality of cam surfaces that are engageable by overrunning coupling rollers. The overrunning coupling permits reaction torque delivery from the stator blades to the stationary sleeve shaft when the torque converter is in a torque multiplication mode. The rollers and the cam surfaces with which they interact will permit free-wheeling motion of the bladed section of the converter when the torque converter is in a coupling mode.

The outer race of a conventional overrunning stator coupling is keyed or splined in a central opening in the stator hub. It is held in place by snap rings located in snap ring grooves machined in the stator hub.

My prior U.S. Pat. No. 5,597,057, which is owned by the assignee of the present invention, and which is hereby incorporated by reference in its entirety, provides an improved overrunning coupling assembly having an annular coupling pocket plate with strut pockets disposed therein and a notch plate disposed in face-to-face relationship with the pocket plate. The notch plate includes notch recesses at angularly spaced positions about the axis and disposed in juxtaposed relationship with respect to the strut pockets. Torque transmitting struts are positioned in the strut pockets and spring-biased for engagement with the notch recesses.

Further improvements in overrunning coupling designs are desirable, particularly those improvements which reduce manufacturing costs and eliminate wear issues. For example, one potential problem associated with the above-referenced overrunning coupling design is that a certain amount of noise may be generated by the struts "slapping" or rattling against the notch recesses of the notch plate. Also, wear of the strut on top and edge surfaces during overrun may be a concern. It is also desirable to reduce the need for constant and controlled lubrication.

DISCLOSURE OF INVENTION

The present invention improves upon prior overrunning coupling designs by providing enlarged strut pockets which allow tangential sliding movement of the struts to decrease the length of a moment arm about which a spring acts upon each strut, thereby enabling the forces of flowing lubricant or grease to hold the strut in a position parallel to a bottom surface of each strut pocket to prevent slapping of the struts against the notch recesses and to reduce wear issues and reduce lubrication requirements.

More specifically, the present invention provides an overrunning coupling assembly including a notch plate and an annular coupling pocket plate positioned in face-to-face relationship with respect to each other along a common axis. The pocket plate has strut pockets disposed at angularly spaced positions about the axis. The notch plate has notch recesses at angularly spaced positions about the common axis and positioned in juxtaposed relationship with respect to the strut pockets. Torque-transmitting struts are positioned in each strut pocket. Each strut has first and second ears at one edge thereof for enabling pivotal motion of the struts about an ear axis intersecting the ears. The opposite edge of each strut is movable between disengaged and engaged positions with respect to one of the notch recesses, whereby one-way torque transfer may occur between the plates. A lubricant flows between the notch plate and pocket plate. A spring is positioned in each strut pocket and biases the respective strut toward the notch plate. Each spring engages the respective strut intermediate the ear axis and the opposite edge. Each strut pocket provides sufficient clearance forward of the respective opposite edge of the strut to allow forward sliding movement of the respective strut during overrunning to cause the engagement of the respective spring and strut to occur nearer the ear axis, thereby reducing the length of a moment arm about which the spring acts upon the strut which enables frictional forces of the flowing lubricant to hold the strut in its flat, disengaged position to prevent the strut from slapping against the notch recesses as the notch plate and pocket plate are respectively counterrotated.

The strut pocket may be sufficiently enlarged to allow strut movement to a position in which the spring force is fully reacted by the ears, or to a position in which the spring is spaced only slightly from the ear axis such that the flowing lubricant holds the strut in the disengaged position. Alternatively, the strut pockets may be sufficiently enlarged to allow sliding movement of each strut to a position in which a forward corner of each strut engages the outer circumferential rail of the notch plate to prevent slapping.

The invention described herein eliminates the noise of struts slapping against the notch plate and eliminates wear issues of the strut top and edge surfaces during overrun. It also eliminates wear issues of the spring against the bottom of the strut and reduces lubrication requirements. Additionally, it eliminates the requirement of a weir which was previously used to seal oil to maintain high oil pressure because the invention does not require a high head pressure of oil within the coupling assembly.

The invention also reduces the need to retain a high volume of oil for hydraulic dampening and reduces the requirement to balance spring force with engagement dynamics, i.e., proper positioning of the spring to overcome centrifugal friction. The invention is a no cost add to current designs, and ultimately should reduce cost. It allows oil to freely flow radially through the pocket plate as needed for lubrication of the friction plates due to decreased oil requirements. Also, the invention allows the use of different materials and different heat treatment for the struts because the wear is significantly reduced.

Accordingly, an object of the present invention is to provide an improved overrunning coupling assembly in which the noise of struts slapping against the notch plate is eliminated.

A further object of the present invention is to provide an improved overrunning coupling assembly in which fluid lubrication volume requirements are significantly reduced and wear issues are reduced for the strut top and edge surfaces, as well as spring wear against the bottom of the strut.

A further object of the present invention is to reduce the amount of lubrication required to dampen struts in an overrunning coupling assembly.

A still further object of the present invention is to provide an improved overrunning coupling assembly which is less expensive to manufacture and offers improved flexibility for alternate materials for various components and eliminates the requirement of a weir for oil level control.

The above objects and other objects, features, and advantages of the present invention are readily apparent from the following detailed description of the best modes for carrying out the invention when taken in connection with the accompanying drawings.

BRIEF DESCRIPTION OF DRAWINGS

FIG. 4 shows an exploded perspective view of an overrunning coupling as described in copending U.S. patent application Ser. No. 09/028,904, which is incorporated by reference herein;

FIG. 4a shows an enlarged partial cross-sectional view of the assembly of FIG. 4;

FIG. 5 shows a schematic plan view of a notch plate, pocket plate, and strut in accordance with the invention with the strut in the locked position;

FIG. 6 shows a vertical cross-sectional view of the assembly of FIG. 5;

FIG. 7 shows a schematic plan view of a notch plate, pocket plate and strut in the overrun position in accordance with the present invention;

FIG. 8 shows a vertical cross-sectional view of the assembly of FIG. 7;

FIG. 9 shows a schematic force diagram of a strut corresponding with FIG. 8; and FIG. 10 shows a schematic plan view of a notch plate, pocket plate and strut in accordance with an alternative embodiment of the invention.

BEST MODES FOR CARRYING OUT THE INVENTION

Figure 1:
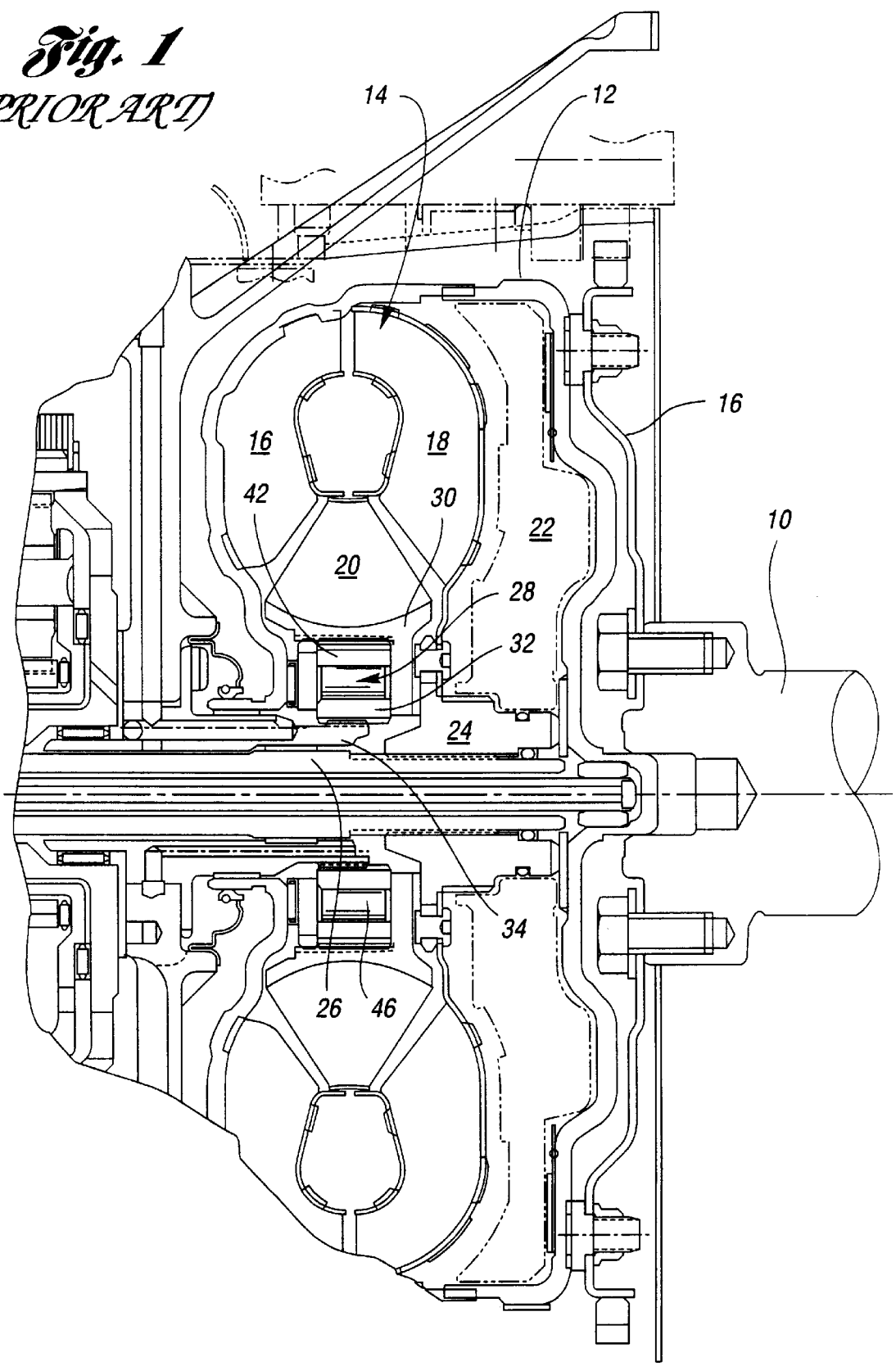
FIG. 1 shows a prior art hydrokinetic torque converter that comprises an impeller, a turbine, and a stator, the stator having a stator hub with a conventional overrunning coupling.

Shown in FIG. 1 is a prior art torque converter. An engine crankshaft 10 is connected drivably to impeller shell 12 of the hydrokinetic torque converter, generally identified by reference numeral 14. This connection is provided by drive plate 15. The impeller shell forms a part of a bladed impeller 16, which is arranged in a torque converter toroidal flow circuit partly defined by turbine 18. A bladed stator 20 is situated between the flow exit section of the turbine and the flow entrance section of the impeller. A torque converter lock-up clutch, not shown, would be located as shown in phantom at 22 in FIG. 1. This clutch, when it is applied, would connect the impeller with the turbine.

Turbine 18 includes a turbine hub 24 which is splined to turbine sleeve shaft 26. The torque input element of the planetary gearing (not shown) is connected drivably to the turbine sleeve shaft.

An overrunning coupling 28 of a conventional prior art design is disposed in the hub 30 of the stator 20. It includes an inner race 32, also shown in FIG. 2, which is splined to a stationary stator sleeve shaft 34 secured to or formed as part of the transmission housing.

Figure 2:
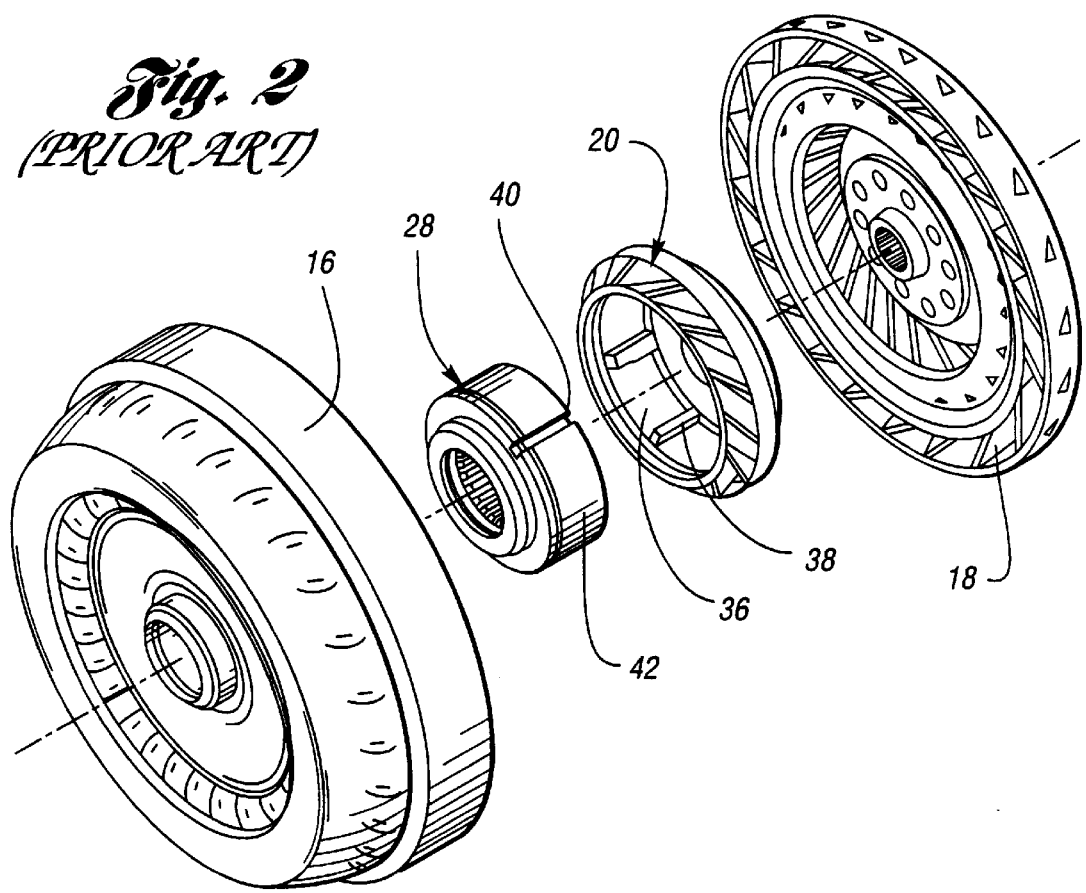
FIG. 2 is a schematic, exploded isometric view of a stator and an overrunning coupling for a stator together with an impeller and a turbine of the kind illustrated in the torque converter cross sectional view of FIG. 1.

FIG. 2 shows in isometric form an exploded view of the stator, the turbine, and the impeller of FIG. 1. Each of these converter elements includes bladed toroidal fluid flow passages. The passages of the stator change the tangential fluid flow velocity vector as fluid leaves the flow exit section of the turbine and enters the flow entrance section of the impeller.

The stator 20 has a hub 36 which is formed with internal spline teeth or keys 38 adapted to be received in axial keyways or tooth spaces 40 in an outer race 42 for the conventional overrunning coupling 28.

Figure 3:
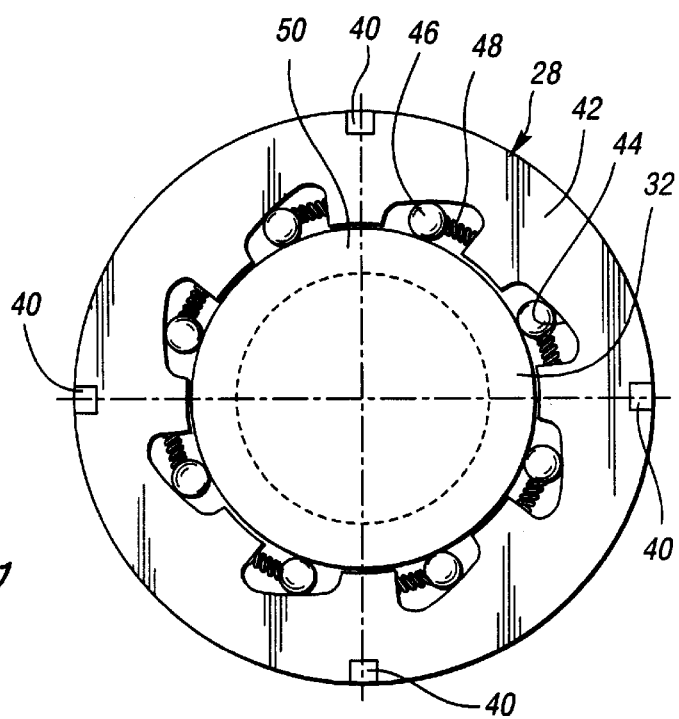
FIG. 3 is a schematic, cross-sectional view of a prior art overrunning roller coupling which may be used in a torque converter hub.

As shown in the schematic view of FIG. 3, prior art coupling 28 comprises a series of cam recesses 44 at angularly spaced locations. Each recess receives a coupling roller 46. A roller spring 48 urges each roller into camming engagement with a cam surface defined by its associated recess 44 so that the rollers are in wedging engagement with the periphery of the inner race 32. Free-wheeling motion of the outer race relative to the inner race thus may take place in one direction, but relative rotation is prevented by the wedging rollers when a torque reversal on the stator 20 takes place.

Turning to FIGS. 4 and 4a, an overrunning coupling assembly 59 is shown as described in commonly owned U.S. patent application Ser. No. 09/028,904, which is incorporated by reference herein. As shown, the assembly 59 includes a pocket plate 60 positioned adjacent a notch plate 62, wherein the pocket plate 60 includes strut pockets 64 configured to receive struts 66 which are spring-biased by a spring 68 for engagement within ramped notch recesses 70 for one-way torque transmission.

During overrunning, the spring 68 biases the strut 66 toward the notch plate 62, which may cause the strut 66 to slap or rattle against the notch recesses 70 of the notch plate 66. This "slapping" against the notch plate may cause noise. The present invention is an improvement upon this design, and is particularly useful in eliminating this "slapping" problem, as well as eliminating wear issues and reducing lubrication requirements. The present invention is described below with reference to FIGS. 5–10.

The present invention is similar to the structure shown in FIG. 4, except that the strut pockets 64 have been enlarged and the springs 68 are now coil springs. Accordingly, an overrunning coupling assembly in accordance with the present invention comprises the structure described above with respect to FIG. 4 including the changes described below with reference to FIGS. 5–10. Referring to FIG. 4, the overrunning coupling assembly of the present invention includes a notch plate 62 positioned in face-to-face relationship with a pocket plate 60 along a common axis 67. Four strut pockets 64 (the structure of each pocket being revised as shown below in FIGS. 5–9) are disposed at angularly spaced positions about the axis 67.

The notch plate 62 includes notch recesses 70 at angularly spaced positions about the common axis 67. With the notch plate 62 and pocket plate 60 positioned in face-to-face relationship, the notch recesses 70 are positioned in juxtaposed relationship with respect to the strut pockets 64. The notch recesses 70 are ramped as shown in FIG. 4a, the struts 66 are spring-loaded toward the notch plate 62 by springs 68 (which have been replaced by the helical springs described in FIGS. 5–9).

The notch plate 62 includes an outer circumferential rail 71 positioned at a radially outward side of the notch recesses 70.

Turning to FIGS. 5–9, the present invention is shown in greater detail, with like reference numerals used to correspond with like components shown in FIG. 4. As shown, each strut 66 has first and second ears 80,82 at one edge 84 thereof, and includes an opposite edge 88. The ears 80,82 and opposite edge 88 cooperate with the strut pocket 86 to limit forward (or tangential) sliding motion of the strut 66 within the strut pocket 86. Each strut 66 is also pivotable about an ear axis 90 for pivotal movement between disengaged and engaged positions with respect to the notch recesses.

FIG. 5 shows the strut 66 in the engaged position wherein the opposite edge 88 of the strut 66 is engaged within the corresponding notch recess 70, as further illustrated in FIG. 6. In the disengaged position, the strut 66 lays flat against the bottom surface 92 of the strut pocket 86, as shown in FIG. 8. By "disengaged position" it its meant that the strut 66 lays flat within the strut pocket 86 regardless of the fore and aft position of the strut 66 in the strut pocket.

The present design is particularly useful when the pocket plate 94 is stationary and the notch plate 62 is rotating. However, the design is also useful when both components are rotating.

As shown in FIGS. 5 and 6, with the one edge 84 of the strut 66 against the rear end 96 of the strut pocket 86, the spring 98 acts against the bottom surface of the strut 66 at a position which is approximately ⅔ of the length of the strut 66 from the one edge 84 of the strut, thereby providing a long moment arm over which the spring 98 acts around the ear axis 90 to force the strut 66 upward to the engaged position, shown in FIG. 6. As the pocket plate 94 and notch plate 62 are counterrotated in an overrunning direction, the strut 66 rides down the ramp 70 to compress the spring 98 and the strut 66 is repositioned flat against the bottom surface 92 of the strut pocket 86.

Once this pivotal motion of the strut 66 to its flat, disengaged position has occurred, friction of the flowing lubricant 99, shown in FIG. 7, along with frictional engagement of the strut 66 with the notch plate 62 causes forward or tangential sliding movement of each strut 66 to its overrunning position, shown in FIG. 7. Movement to this position occurs immediately with less than 5° of rotation of the respective components to quickly eliminate the slapping noise. When the rotational directions or relative speeds of the notch plate and pocket plate are changed, the struts will slide back to their starting position prior to overrun just as quickly for lock-up.

At this overrunning position, the strut 66 has slid approximately ½ its length forward in the strut pocket 86 so that the spring 98 is repositioned substantially closer to the ear axis 90, thereby substantially reducing the moment arm about which the spring 98 acts upon the strut 66 about the ear axis 90. This reduced moment arm allows the frictional forces of the flowing lubricant 99 to hold the strut 66 flat in its disengaged position. Accordingly, with the forces of the flowing fluid 98 holding the strut 66 flat in its disengaged position, the strut 66 is prevented from slapping against the notch recesses 70 as the notch plate 62 and pocket plate 94 are respectively counterrotated in the direction shown by the arrows 100,102 of FIG. 7. This flat, disengaged position of the strut 66 is also shown in FIG. 8, wherein the spring 98 has been repositioned closer to the one edge 84 of the strut.

A force diagram schematic is shown in FIG. 9 corresponding with the strut position shown in FIG. 8. As shown, the spring force $F_S$ acts upon the bottom of the strut 66 a distance X from the ear axis 90. The distance X is a moment arm about which the spring force $F_S$ acts to rotate the strut 66 about the ear axis 90. $F_E$ is the downward force reacted by the ears 80,82 of the strut 66 against the rails of the notch plate 62. $F_T$ represents the downward force of the flowing lubricant 99 acting upon the top surface of the strut 66 to hold the strut 66 in its flat, disengaged position against the bottom surface 92 of the strut pocket 86.

Accordingly, as viewed in FIG. 5, the strut pocket 86 includes a clearance area 106 in a direction forward of the opposite edge 88 of the strut 66 which enables forward or tangential sliding movement of the strut 66 to the position shown in FIG. 7 for overrunning. Clearance areas 108,110, shown in FIG. 5, are also provided in front of the respective ears 80,82 to allow such forward sliding movement to the overrun position shown in FIG. 7, wherein the forces of the flowing lubricant 99 are operative to hold the strut 66 in its flat, disengaged position to prevent the strut from slapping against the notch recesses 70 as the notch plate and pocket plate are respectively counterrotated.

In the position shown in FIGS. 7 and 8, the spring 98 engages the strut 66 at a position spaced from the ear axis 90 by a distance approximately 20% of a length of the strut 66 between the edges 96,88.

Accordingly, the pocket geometry allows the strut to move forward during overrunning thereby reducing the teetering effect the strut undergoes as the notch plate moves across the strut. The spring force is essentially fully reacted by the strut ears in combination with the downward force of oil on the short moment arm. Alternatively, the spring could engage the strut at the ear axis, thereby resulting in a zero length moment arm, in which case the spring force will be fully reacted by the strut ears.

This design needs only viscous and frictional drag during overrunning in a planar-type one-way clutch to reposition the strut so that it is stabilized. Also, in a rotating pocket plate design in which both the pocket plate and the notch plate are rotated, rapid deceleration of the pocket plate is used to cause the strut to slide back into its lock up position prior to engagement.

Turning to FIG. 10, an alternative embodiment of the invention is shown wherein the strut pocket 120 is sufficiently enlarged in a direction forward of the front edge 122 of the strut 124 to allow sliding movement of the strut 124 from the position shown in phantom in FIG. 10 to the overrun position shown in solid lines in FIG. 10 wherein the forward corner 126 of the strut 124 engages the outer circumferential rail 128 of the notch plate during overrunning to prevent the struts 124 from slapping against the notch recesses during overrunning, as described above with respect to the embodiment of FIGS. 5–9.

While the best modes for carrying out the invention have been described in detail, those familiar with the art to which this invention relates will recognize various alternative designs and embodiments for practicing the invention within the scope of the appended claims.

What is claimed is:

1. An overrunning coupling assembly comprising:

a notch plate and an annular coupling pocket plate positioned in face-to-face relationship with respect to each other along a common axis;

said pocket plate having strut pockets disposed at angularly spaced positions about said common axis;

said notch plate having notch recesses at angularly spaced positions about said common axis and positioned in juxtaposed relationship with respect to said strut pockets;

torque-transmitting struts in said strut pockets, each strut having first and second ears at one edge thereof for enabling pivotal motion of the struts about an ear axis intersecting the ears, the opposite edge of each strut being movable between disengaged and engaged positions with respect to one of said notch recesses whereby one-way torque transfer may occur between said plates;

a lubricant flowing between the notch plate and pocket plate;

a spring positioned in each said strut pocket and biasing the respective strut toward the notch plate, each said spring engaging the respective strut intermediate said ear axis and said opposite edge;

wherein each said strut pocket provides sufficient clearance forward of the respective opposite edge of the strut to allow forward sliding movement of the respective strut during overrunning to cause said engagement of the respective spring and strut to occur nearer the ear axis, thereby reducing the length of a moment arm about which the spring acts upon the strut which enables frictional forces of the flowing lubricant to hold the strut in its disengaged position to prevent the strut from slapping against the notch recesses as the notch plate and pocket plate are respectively counterrotated; and wherein said notch plate includes an outer circumferential rail at a radially outward side of the notch recesses, and wherein each said strut pocket provides sufficient clearance to allow forward sliding movement of the strut to enable a corner of the strut to be supported by the outer circumferential rail to prevent said slapping.

2. The overrunning coupling assembly of claim 1, wherein each said strut pocket provides sufficient clearance to allow forward sliding movement of the respective strut to cause said engagement to occur at the ear axis.

3. The overrunning coupling assembly of claim 1, wherein each said strut pocket provides sufficient clearance to allow forward sliding movement of the respective strut to cause said engagement to occur at a position spaced from the ear axis approximately 20% of a length of the strut.

4. The overrunning coupling assembly of claim 1, wherein each said strut pocket provides sufficient clearance to allow forward sliding movement of the respective strut a distance of approximately 50% of a length of the strut.

5. The overrunning coupling assembly of claim 1, wherein said struts and notch plate are configured such that said forward sliding movement is caused by friction between said struts and said notch plate.

6. The overrunning coupling assembly of claim 1, wherein said pocket plate is stationary.

7. An overrunning coupling assembly comprising:

a notch plate and an annular coupling pocket plate positioned in face-to-face relationship with respect to each other along a common axis;

said pocket plate having strut pockets disposed at angularly spaced positions about said common axis;

said notch plate having notch recesses at angularly spaced positions about said common axis and positioned in juxtaposed relationship with respect to said strut pockets;

torque-transmitting struts in said strut pockets, each strut having first and second ears at one edge thereof for enabling pivotal motion of the struts about an ear axis intersecting the ears, the opposite edge of each strut being movable between disengaged and engaged positions with respect to one of said notch recesses whereby one-way torque transfer may occur between said plates;

a lubricant flowing between the notch plate and pocket plate;

a spring positioned in each said strut pocket and biasing the respective strut toward the notch plate, each said spring engaging the respective strut intermediate said ear axis and said opposite edge;

wherein each said strut pocket is sufficiently enlarged to allow sliding movement of the respective strut in a direction tangential to a rotational direction of the notch plate during overrunning to cause said engagement of the respective spring and strut to occur closer to said one edge of the strut than the opposite edge, thereby reducing the length of a moment arm about which the spring acts upon the strut which enables viscous drag of the flowing lubricant to hold the strut in its disengaged position to prevent the strut from slapping against the notch recesses as the notch plate and pocket plate are respectively counterrotated; and wherein said notch plate includes an outer circumferential rail at a radially outward side of the notch recesses, and wherein each said strut pocket is sufficiently enlarged to allow tangential sliding of the respective strut to enable a corner of the strut to be supported by the outer circumferential rail to prevent said slapping.

8. The overrunning coupling assembly of claim 7, wherein each said strut is movable in said tangential direction to a position in which the force of each spring is substantially fully reacted by the ears of the respective strut.

9. The overrunning coupling assembly of claim 8, wherein said engagement occurs at the ear axis of each strut at said position.

10. The overrunning coupling assembly of claim 7, wherein each said strut pocket is sufficiently enlarged to allow said engagement to occur at a position spaced from the respective strut axis approximately 20% of a length of the strut.

11. The overrunning coupling assembly of claim 7, wherein each said strut pocket is sufficiently enlarged to allow tangential sliding movement of the respective strut a distance approximately 50% of a length of the strut.

* * * * *